US007204021B2

(12) United States Patent
Houseman et al.

(10) Patent No.: US 7,204,021 B2
(45) Date of Patent: Apr. 17, 2007

(54) MULTI-PURPOSE PLASTIC PIPE CUTTER

(75) Inventors: Eric M. Houseman, 1503 Lark Bunting Pl., Longmont, CO (US) 80501; Ronald A. Angstead, Longmont, CO (US); Brent W. Murray, Longmont, CO (US); Patrick M. Bertsch, Longmont, CO (US)

(73) Assignee: Eric M. Houseman, Longmont, CO (US)

( * ) Notice: Subject to any disclaimer, the term of this patent is extended or adjusted under 35 U.S.C. 154(b) by 0 days.

(21) Appl. No.: 11/256,481

(22) Filed: Oct. 21, 2005

(65) Prior Publication Data

US 2006/0254057 A1 Nov. 16, 2006

Related U.S. Application Data

(60) Provisional application No. 60/681,335, filed on May 16, 2005.

(51) Int. Cl.
*B23D 21/12* (2006.01)
*B23D 21/00* (2006.01)

(52) U.S. Cl. .............................. 30/92; 30/235; 30/236; 30/239; 30/258; 7/129; 7/137; 7/157; 7/158

(58) Field of Classification Search .................... 30/92, 30/94, 108, 112, 145, 146, 179, 190, 192, 30/212, 233, 234, 235, 236, 239, 258, 261, 30/262; 7/127, 129, 137, 138, 143, 157, 7/158
See application file for complete search history.

(56) References Cited

U.S. PATENT DOCUMENTS 64,692 A * 5/1867 Neff, Jr. ...................... 30/262
109,192 A * 11/1870 Dubois ........................ 30/145
114,770 A * 5/1871 Currier .......................... 7/127
276,793 A * 5/1883 Erdman et al. ................ 7/128
393,227 A * 11/1888 Freethy ......................... 7/127
812,528 A * 2/1906 Rohrer ........................ 30/239
2,227,844 A * 1/1941 Roche ........................... 30/92
2,678,575 A * 5/1954 Marano ....................... 81/423
2,798,555 A * 7/1957 Launay ........................ 30/233
3,339,281 A * 9/1967 Chow .......................... 30/262
3,390,455 A * 7/1968 Florian ........................ 30/251
3,553,999 A * 1/1971 Rommel ...................... 72/324
3,849,881 A 11/1974 Strybel ........................ 30/102
4,084,317 A * 4/1978 Nakamura et al. ............. 30/94
4,176,450 A * 12/1979 Muromoto ..................... 30/92
4,312,127 A * 1/1982 Tanaka .......................... 30/92
4,349,928 A 9/1982 Mlikotin ........................ 7/157
4,368,577 A 1/1983 Babb ............................. 30/92
4,521,963 A 6/1985 Lind et al. ...................... 30/92
4,587,732 A 5/1986 Lind et al. ...................... 30/92
4,611,358 A 9/1986 Mills et al. .................... 7/157

(Continued)

*Primary Examiner*—Boyer D. Ashley
*Assistant Examiner*—Edward Landrum
(74) *Attorney, Agent, or Firm*—Rick Martin; Patent Law Offices of Rick Martin, PC

(57) ABSTRACT

Upper and lower handle members are pivotally attached at one end. Crimper jaws are operated via the handles. The upper handle carries a guide assembly to mount the blade, and operate the cutting mode using an upper handle cradle. Other accessories include a hole punch, a nut driver, a rivet remover and a hammer.

17 Claims, 4 Drawing Sheets

U.S. PATENT DOCUMENTS

| | | | | | |
|---|---|---|---|---|---|
| 4,637,084 | A | | 1/1987 | Wood | 7/134 |
| 4,674,184 | A | * | 6/1987 | Anderson | 30/92 |
| 4,953,248 | A | * | 9/1990 | Trombetta | 7/107 |
| 4,995,128 | A | * | 2/1991 | Montgomery et al. | 7/127 |
| 5,063,770 | A | * | 11/1991 | Chen | 72/409.11 |
| 5,123,456 | A | | 6/1992 | Jansen | 140/93.4 |
| 5,129,158 | A | | 7/1992 | Campagna | 30/92 |
| 5,159,757 | A | * | 11/1992 | Weid et al. | 30/251 |
| 5,323,502 | A | * | 6/1994 | Miller | 7/107 |
| D412,095 | S | | 7/1999 | Tally | D8/60 |
| 5,987,750 | A | | 11/1999 | Tally | 30/92 |
| 6,154,964 | A | | 12/2000 | Tally | 30/92 |
| D453,287 | S | | 2/2002 | Picaza | D8/60 |
| 6,370,780 | B1 | | 4/2002 | Robertson et al. | 30/261 |
| 6,487,776 | B2 | | 12/2002 | Chang | 30/92 |
| 6,553,670 | B2 | | 4/2003 | Chang | 30/92 |
| 6,658,738 | B1 | | 12/2003 | King | 30/92 |
| 6,752,054 | B2 | | 6/2004 | Knight | 83/13 |
| 6,766,581 | B2 | | 7/2004 | Nordlin | 30/252 |
| 6,769,181 | B1 | | 8/2004 | Scheuerman et al. | 30/92 |
| 2002/0023354 | A1 | * | 2/2002 | Lowe et al. | 30/142 |
| 2002/0083593 | A1 | | 7/2002 | Chang | 30/92 |
| 2002/0148118 | A1 | | 10/2002 | Chang | 30/92 |
| 2002/0170182 | A1 | | 11/2002 | Nordlin | 30/251 |

* cited by examiner

MULTI-PURPOSE PLASTIC PIPE CUTTER

CROSS REFERENCE APPLICATIONS

This application is a non-provisional application claiming the benefits of provisional application no. 60/681,335 filed on May 16, 2005.

FIELD OF INVENTION

The present invention relates to blade cutters for plastic pipes, often used in sprinkler installations.

BACKGROUND OF THE INVENTION

The installation of lawn sprinkler systems requires several steps. A plastic pipe is cut. Various fittings such as a right angle are tapped into the pipes, metal pinch clamps are fastened around joints, screw clamps are fastened around joints, and holes are punched into drip tubing elements. Presently several hand tools are used to accomplish these tasks. A brief summary of relevant art follows below.

U.S. Pat. No. 3,849,881 (1974) to Strybel discloses a metal tube specialized cutter with a cutting wheel.

U.S. Pat. No. 4,349,928 (1982) to Mlikotin discloses a multi-purpose copper tube cutter.

U.S. Pat. No. 4,368,577 (1983) to Babb discloses a one-purpose plastic pipe cutter with a blade and a ratchet type handle.

U.S. Pat. No. 4,521,963 (1985) and U.S. Pat. No. 4,587,732 (1986) to Lind et al. discloses a crimping feature on a piston driven pipe cable cutter.

U.S. Pat. No. 4,611,358 (1986) to Mills et al. discloses a copper tube wheel type cutter.

U.S. Pat. No. 4,637,084 (1987) to Wood discloses a wire/cable cutter and crimper with two elongate handle members.

U.S. Pat. No. 5,123,456 (1992) to Jansen discloses a banding tool.

U.S. Pat. No. 5,129,158 (1992) to Campagna discloses a plastic pipe guillotine cutter.

U.S. Pat. No. 5,987,750 (1999) and U.S. Pat. No. 6,154,964 to Tally discloses a tube cutter.

U.S. Pat. No. 6,370,780 (2002) to Robertson et al. discloses a leaf spring improvement to the handles of a plastic pipe cutter.

U.S. Pat. No. 6,487,776 (2002) and U.S. Pat. No. 2002/0148118 (2002) to Chang disclose a lower arm with a cradle for plastic pipe and an upper arm with a replaceable blade. A pivot at a distal end holds the arms together.

U.S. Pat. No. 6,553,670 (2003) and U.S. Pat. No. 2002/0083593 (2002) to Chang disclose a caulk gun style trigger handle for a cutter.

U.S. Pat. No. 6,658,738 (2003) to King discloses an adjustable jaw for cutting plastic pipes.

U.S. Pat. No. 6,752,054 (2004) to Knight discloses a sheet metal cutter.

U.S. Pat. No. 6,766,581 (2004) and U.S. Pat. No. 2002/0170182 to Nordlin disclose a cable cutter/crimper with a ratchet closure means.

U.S. Pat. No. 6,769,181 (2004) to Scheuerman et al. discloses a crimped ring remover.

U.S. Pat. No. Des. 412,095 (1999) to Tally disclose a right angle blade on a cutter.

U.S. Pat. No. D453,287 (2002) to Picaza discloses a fixed blade pincer type cutter.

What is needed is a multi-purpose hand tool to cut, tap, crimp, screw, and hole punch elements in a plastic pipe system. The present invention provides all these functions and offers a replaceable blade.

SUMMARY OF THE INVENTION

An aspect of the present invention is to provide a hand held tool with a pivot point at a distal end and a replaceable blade on an upper member of the handle pair.

Another aspect of the present invention is to provide a crimper tool.

Another aspect of the present invention is to provide a hammer feature on a handle member.

Another aspect of the present invention is to provide a nut driver on a handle member.

Another aspect of the present invention is to provide a hole punch in a handle member.

Another aspect of the present invention is to provide a blade removal punch.

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
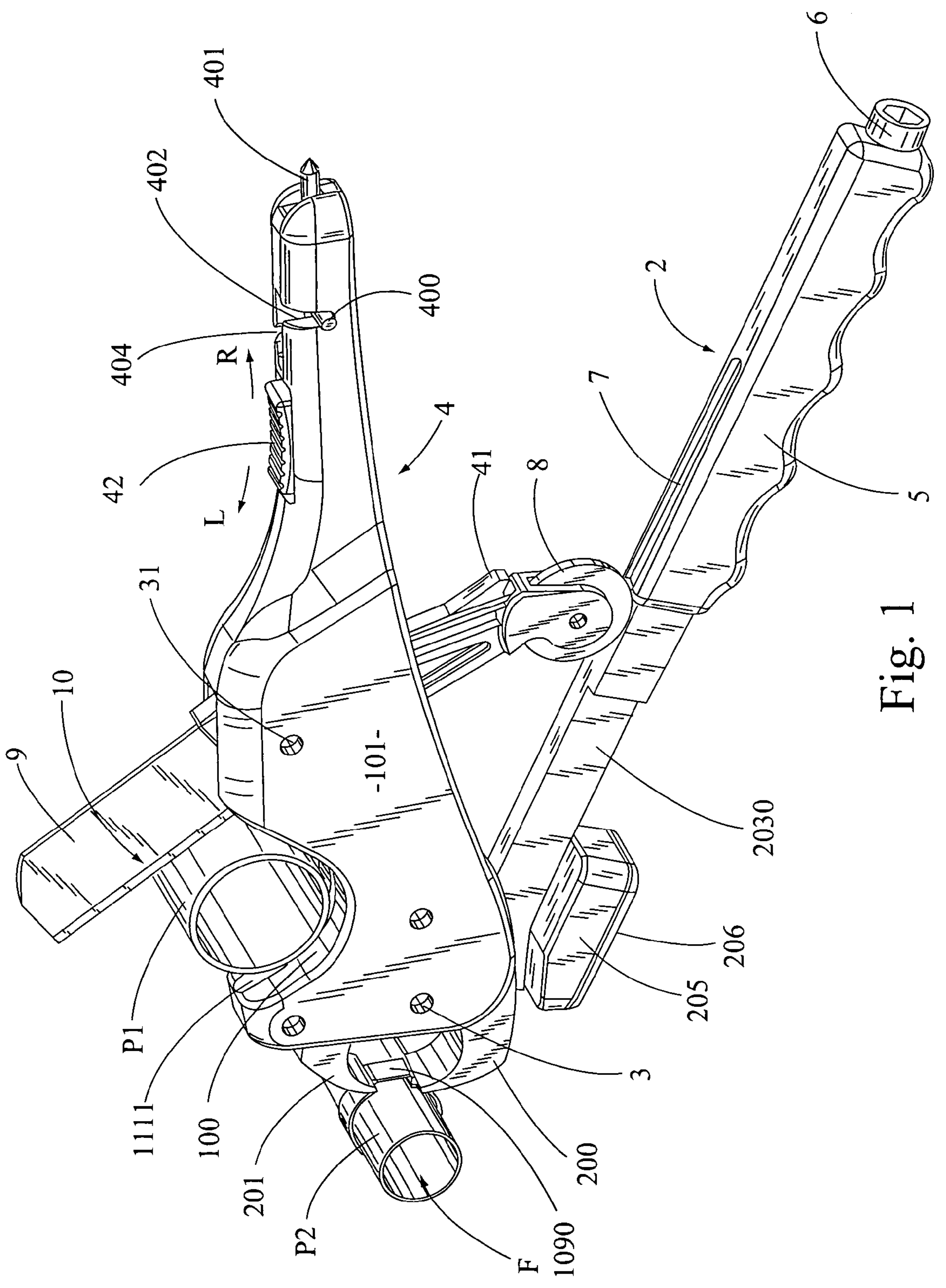
FIG. 1 is a perspective view of the preferred embodiment multi-purpose hand tool.

Referring first to FIG. 1 a multi-purpose hand tool 1 consists of a lower handle 2 having a pivot point (rivet) 3 joining an upper handle 4.

The lower handle 2 has a grip 5 and a nut driver 6 which may be a 5⁄16 inch driver commonly used for sprinkler components. A groove 7 receives a guide wheel 8. See FIG. 3 for detail of the blade mount/guide wheel assembly 30.

The removable blade 9 has a straight cutting edge 10. The blade 9 mounts via rivet 31 and two rivets 32, 33. The guide housing 34 has a slot 35 to house the blade rivet remover 36 for removing rivets 32, 33. The guide housing 34 has an axle 37 for wheel 8. A spring catch 38 holds the automatic opening spring 39 to the upper arm catch 40. The guide housing 34 has a safety catch 41 to receive the safety slide 42/42A (FIG. 2).

Figure 2:
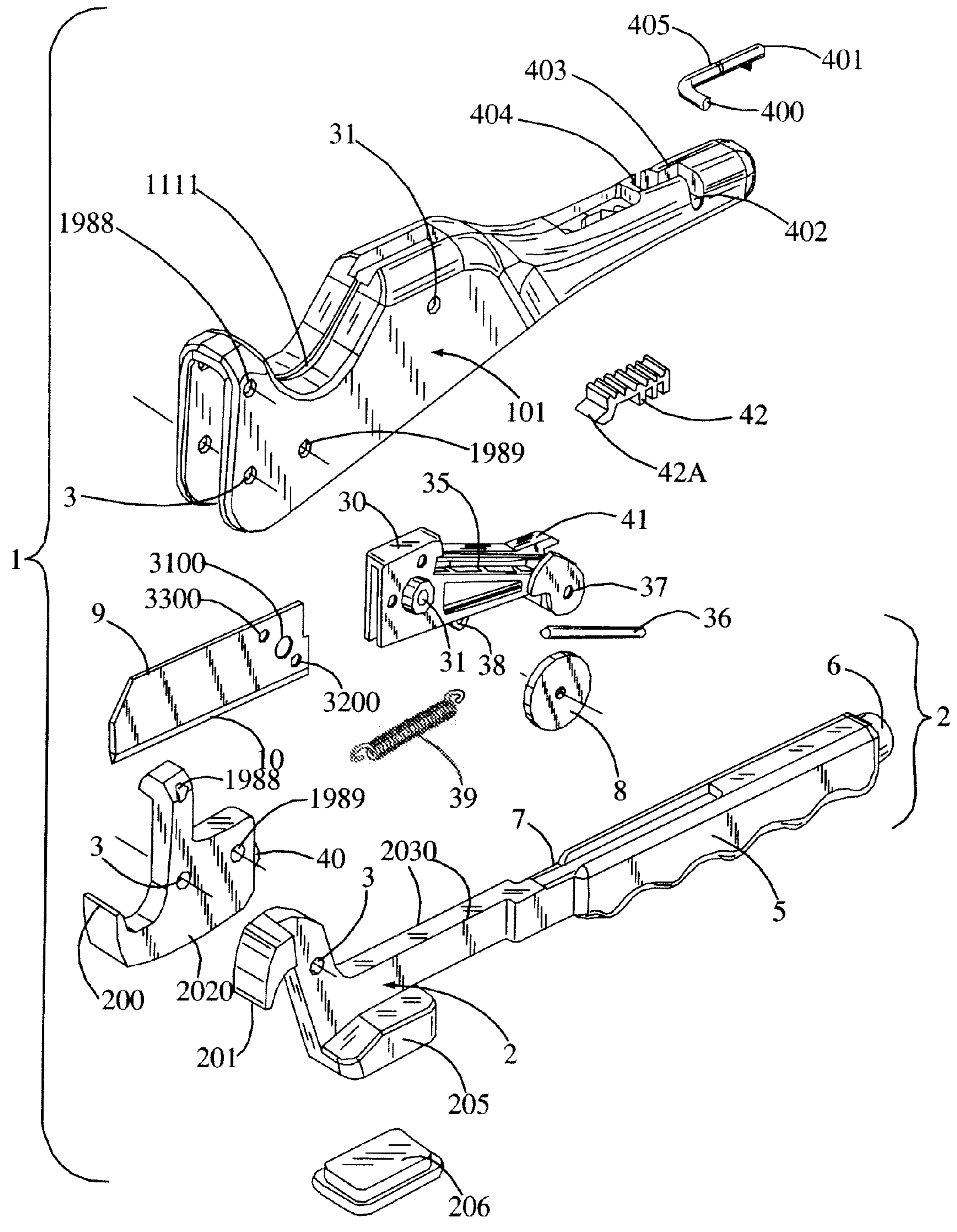
FIG. 2 is an exploded view of the FIG. 1 embodiment.
Figure 4:
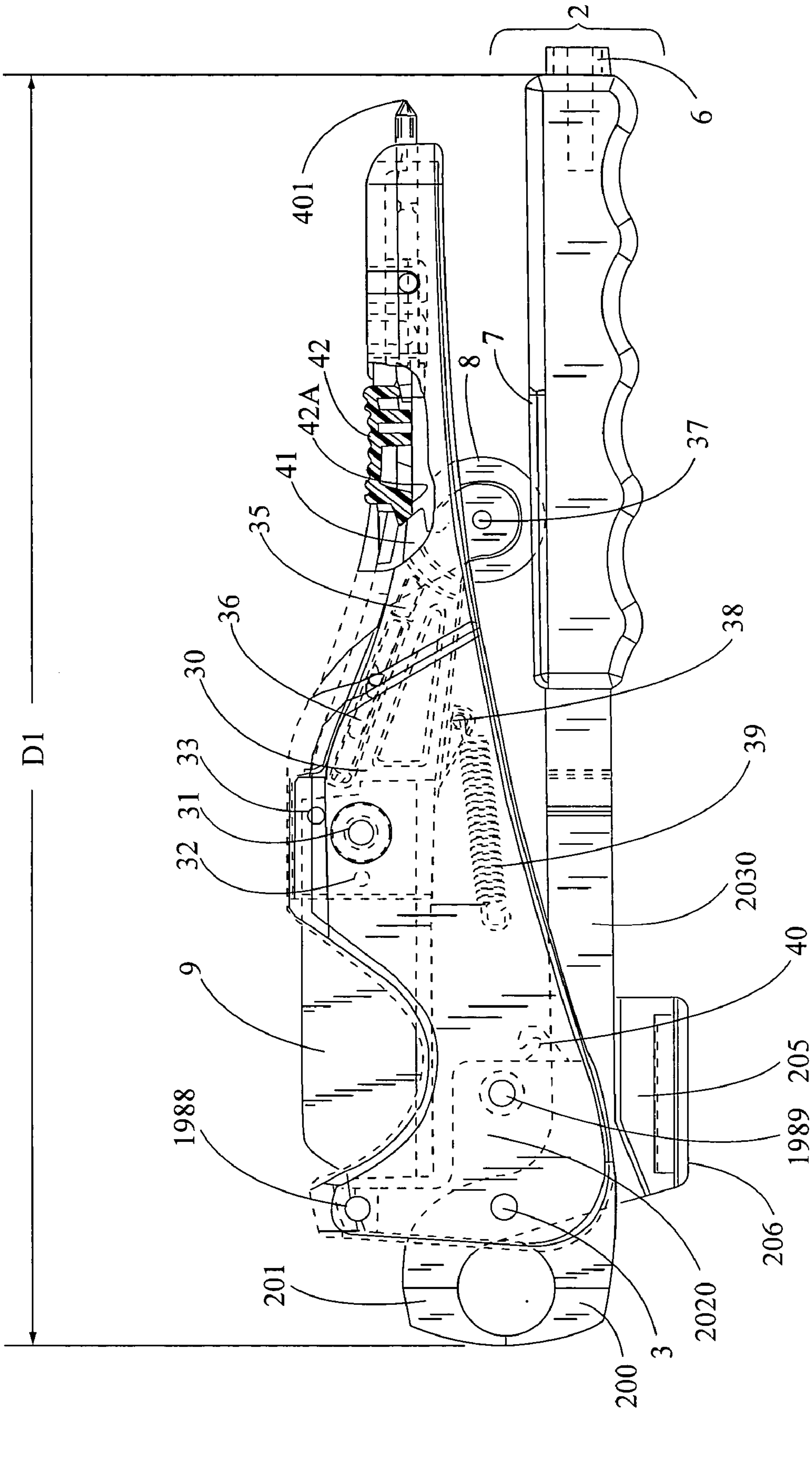
FIG. 4 is a side plan cutaway view of the FIG. 1 embodiment.

In FIG. 1 the upper arm is moved to the open cut mode shown via spring 39 (FIGS. 2, 4). In this open cut mode the blade 9 is ready to cut pipe P, in the cradle 100 of the upper arm housing 101. The thumb slide 42 is on release R position, thereby releasing catch 41 on the guide assembly 30.

After the cutting operation the blade 9 is secured inside the housing 101 via moving the thumb slide 42 to lock L, thereby catching catch 41 in member 42A of FIG. 2. Catch 41 is designed to automatically kick out with each use for safety if the thumb slide 42 is accidentally left in the locked position. With the blade safe, other features of the tool 1 can be used. The rivet remover 36 fits in slot 35 to remove blade rivets 3200, 3300. Hole 3100 receives rivet 3. Holes 1988, 1989 secure rivets 3200, 3300.

The crimper jaws 200, 201 can lock the pinch lock 1090 of the pinch clamp C around the pipe $P_2$. A fitting would have been placed in hole F before the crimping. To install the fitting the hammer 205 that has a rubber surface 206 is used.

The punch end 401 has a shaft 405 and a 90° handle 400. The handle 400 is shown locked open in slot 402. A travel slot 403 allows movement to locking slot 404 to retract the punch end 401.

Jaw block 2020 bolts into housing 101 via boltholes 1988, 1989. Shank 2030 structurally forms the lower handle 2. The blade safety groove 1111 is shown in housing 101 of FIG. 2.

Figure 3:
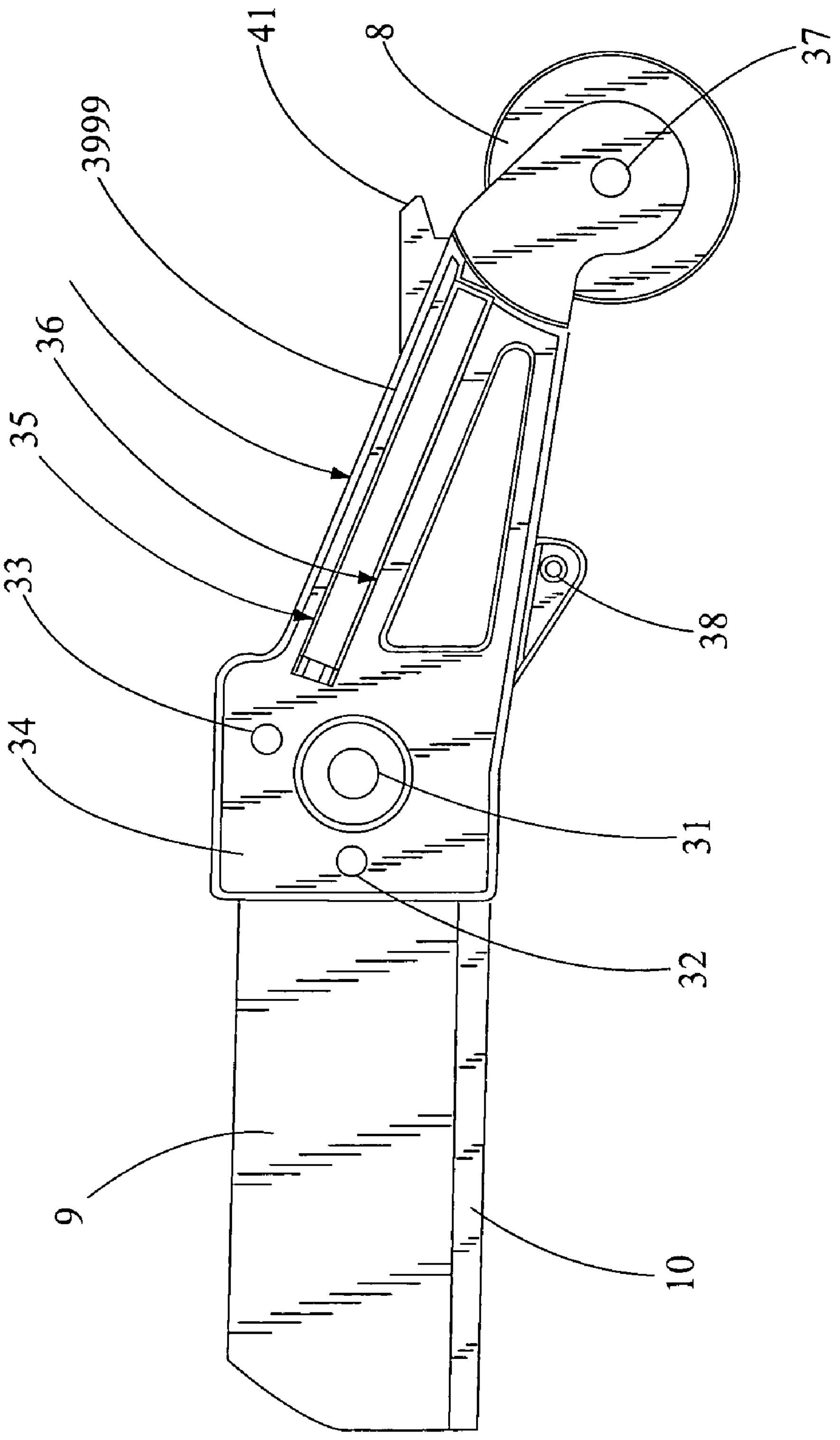
FIG. 3 is a side plan view of the blade and guide assembly.

Referring next to FIGS. 3, 4, in FIG. 4 the guide assembly 30 is shown locked into the safe mode via thumb slide 42/42A. Nominal length D1 of the tool 1 is 10.063 inches. Stopper back 3999 stops the blade 9 after the cut operation.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A hand held pipe cutter comprising:

an upper arm member and lower arm member with a first end of each member being a handle, respectively called an upper handle and lower handle, wherein a second end of both of these two arm members are rotatably joined at a pivot point;

an upper arm mounted guide assembly for holding a blade, an opening spring, a guide wheel, a lock latch, and a stopper back portion;

a nested cradle on said upper arm member facing opposite the blade of said guide assembly;

wherein said nested cradle has a suitably shaped supporting surface for receiving the hose and tube to be cut by said cutting blade;

said handles supporting crimper jaws;

said guide assembly further comprising a support for a removable blade;

wherein the removable blade is supported above the upper arm member when the upper and lower arm members are in an open position; and wherein said removable blade closes against a recess in the upper arm member when the upper and lower arm members are in a closed position.

2. The cutter of claim 1 further comprising a hammer surface.

3. The cutter of claim 2 further comprising a nut driver and a punch.

4. The cutter of claim 1 wherein the upper handle has a switch to manually catch and release the lock latch, wherein the blade is nested in a groove and made safe when the switch catches the lock latch.

5. A pipe cutter comprising:

a pair of handle means pivotally attached at their respective distal ends functioning to open via a spring bias and close via a manual force;

said pair of handle means further comprising an upper and a lower handle;

a guide means pivotally attached to the upper handle functioning to support a removable blade;

said guide means having a safety latch means functioning to lock the blade in a safety groove of the upper handle when the handles are in a closed position;

said pair of handle means further comprising a pair of crimper jaws;

wherein the guide means further comprises a wheel rollable against the lower handle; and wherein the removable blade is supported above the upper handle when the pair of handle means is in an open position.

6. The cutter of claim 5 further comprising a hammer surface.

7. The cutter of claim 5 further comprises a punch.

8. The cutter of claim 5 further comprising a nut driver.

9. A cutting tool for use with a plastic pipe and fittings, said cutting tool comprising:

an upper handle having a distal end with a pivot point attaching a lower handle;

wherein said upper and lower handles are manually manipulated toward one another to perform a cutting operation;

said upper handle having a second pivot point attaching a guide assembly means functioning to mount a detachable blade, to guide said upper and lower handles during the cutting operation, and to spring bias the upper and lower handles apart;

wherein, said blade is received in a cradle of the upper handle;

said upper and lower handles each further comprising a crimper jaw member;

said tool further comprising a hammer surface;

wherein the guide assembly means further comprises a wheel, which travels in a track of the lower handle;

wherein the second pivot is located about at a midpoint of the upper handle; and wherein the blade is supported above the upper handle when the upper and lower handles are apart in an open position.

10. The tool of claim 1 further comprises a punch.

11. The tool of claim 10 further comprising a nut driver.

12. The tool of claim 1, wherein the guide assembly means further comprises a removable blade rivet remover.

13. The tool of claim 1, wherein the upper handle further comprises a manual slide means functioning to catch and release the guide assembly means, wherein said blade is rendered safe when the manual slide means catches the guide assembly means.

14. The tool of claim 13, wherein the manual slide means further comprises a thumb slide.

15. The tool of claim 10, wherein the punch is mounted in a slot and has a handle to be placed in a retracted position along the slot.

16. The tool of claim 13, wherein the upper handle further comprises a blade safety groove.

17. A cutting tool for use with a plastic pipe and fittings, said cutting tool comprising:

an upper handle having a distal end with a pivot point attaching a lower handle;

wherein said upper and lower handles are manually manipulated toward one another to perform a cutting operation;

said upper handle having a second pivot point attaching a guide assembly means functioning to mount a detachable blade, to guide said upper and lower handles during the cutting operation, and to spring bias the upper and lower handles apart;

wherein, said blade is received in a cradle of the upper handle;

said upper and lower handles each further comprising a crimper jaw member;

said tool further comprising a hammer surface; and wherein the guide assembly means further comprises a removable blade rivet remover.

* * * * *